Oct. 27, 1925.

T. CHREY ET AL

CONVERTIBLE BODY FOR MOTOR CARS

Filed Jan. 22, 1924

1,558,837

T. Chrey
E. R. Milligan
INVENTORS

BY  Victor J. Evans
ATTORNEY

Patented Oct. 27, 1925.

1,558,837

UNITED STATES PATENT OFFICE.

THEODORE CHREY AND ERNEST R. MILLIGAN, OF BREMERTON, WASHINGTON.

CONVERTIBLE BODY FOR MOTOR CARS.

Application filed January 22, 1924. Serial No. 687,851.

*To all whom it may concern:*

Be it known that we, THEODORE CHREY and ERNEST R. MILLIGAN, citizens of the United States, residing at Bremerton, in the county of Kitsap and State of Washington, have invented new and useful Improvements in a Convertible Body for Motor Cars, of which the following is a specification.

The object of this invention is to provide for transforming a two door sedan car of the Ford type into a structure adapted for sleeping purposes.

A further object is to effect this result chiefly with the elements comprising the usual seats found in this type of car body, but to provide in addition a flexible element to be stretched across the front of the body and designed to cooperate with the cushions and seats in supporting a mattress.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1:
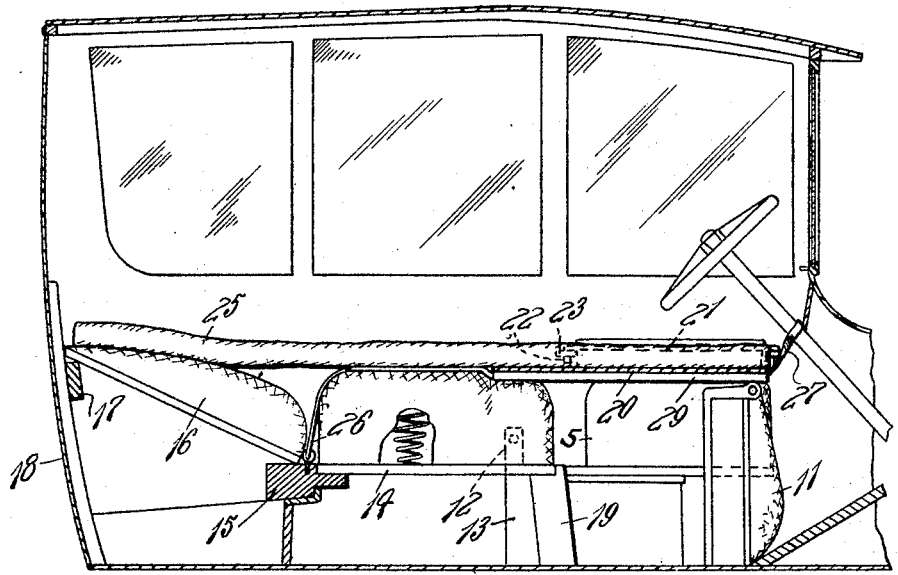
Figure 1 is a vertical longitudinal section through a body of a motor car, with the seats re-arranged as herein indicated.
Figures 2, 3:
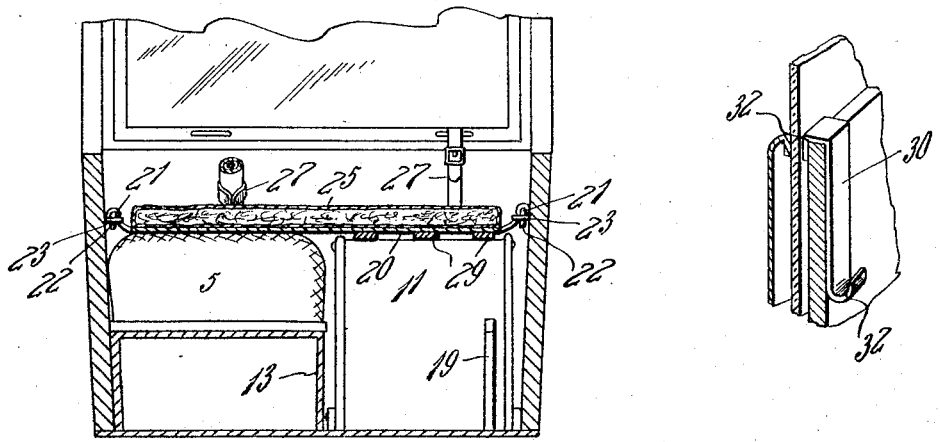
Figure 2 is a vertical transverse section, through the structure of Figure 1, portions being broken away.
Figure 3 shows a type of hanger which may be employed for suspending the rods 21 of Figures 1 and 2.

In carrying out the invention, the driver's seat 5 is moved forward about six inches to the position shown.

The back of the driver's seat is removed, and the back 11 of the seat adjacent to the driver's seat is folded over. In removing the back of the driver's seat, it is only necessary to cut off the rivets which retain the back and which pass through the horns or braces 12.

The rear seat 14 is removed from its normal position and turned end for end, so that its rear edge will be toward the front and will engage the elements 12 in the manner shown. The opposite edge of seat 14 is caused to rest on blocks 15, the front edge resting on seat 13.

The back 16 used in connection with the rear seat is also turned so that the edge serving under normal conditions as the upper edge will be toward the front, and this edge rests on blocks 15. The other edge rests on strip or block 17 secured to the rear wall 18 of the body, and spaced about 14½ inches from the rear seat support. A wooden strip 19 of about ten inches in length is inserted in the position shown.

A canvas strip 20, termed a spreader, is stretched across the forward portion of the body, and over the forward seats, and is connected with rods 21 having downturned ends 22 for engaging screw-eye members 23 mounted in the inner wall of the body, about seven inches below the windows. A mattress 25 is then placed over the approximately level structure, and straps 26, 27 having been secured, the bed is ready for use.

The canvas strip 20 may have wooden strips 29 secured to the under side thereof, and the forward ends of these strips rest on the folded front seat, the other ends resting on cushion 14. The driver's seat 5 supports the other side portion of strip 20.

Instead of mounting the strip of canvas as described, we may employ hangers 30 having lower hooks 31 for holding the rods, and having upper flattened hooks 32 adapted to fit the edges of the doors in the manner shown.

It will be understood that this arrangement is adapted for use in connection with any make of car having a seating plan similar to that here described.

What we claim is:

In a device of the class described, a mattress, a flexible supporting strip therefor, adapted to extend transversely of a vehicle body, means retaining the side edges of the strip, reinforcing slats connected with the under side of a portion of said strip, movable resilient supporting elements under the forward and rear portions of the slats, and an additional movable resilient support under that portion of the strip not reinforced by slats, said strip being secured at points adjacent to the rear base portion of one of the resilient supports for the slats, and being secured at the front end of the strip.

In testimony whereof we affix our signatures.

THEODORE CHREY.
ERNEST R. MILLIGAN.